United States Patent [19]
Mueller

[11] Patent Number: 6,166,931
[45] Date of Patent: Dec. 26, 2000

[54] FILTER FOR A D. C. CONVERTER

[75] Inventor: Wolfgang Mueller, Untersiggingen, Germany

[73] Assignee: Dornier GmbH, Friedrichshafen, Germany

[21] Appl. No.: 09/449,490

[22] Filed: Nov. 29, 1999

[30] Foreign Application Priority Data

Nov. 27, 1998 [DE] Germany ............... 198 55 439

[51] Int. Cl.$^7$ .................................................. H02M 1/14
[52] U.S. Cl. ................................................. 363/46; 363/47
[58] Field of Search .................... 363/39, 40, 44, 363/45, 46, 47, 48, 74, 76, 77

[56] References Cited

U.S. PATENT DOCUMENTS

| | | | |
|---|---|---|---|
| 3,340,458 | 9/1967 | Keller | 363/48 |
| 4,262,328 | 4/1981 | Bloom et al. | 363/39 |
| 4,298,924 | 11/1981 | Genuit | 363/48 |
| 4,594,648 | 6/1986 | Gallios | 363/46 |
| 4,710,861 | 12/1987 | Kanner | 363/46 |
| 4,795,959 | 1/1989 | Cooper | 363/39 |
| 4,888,675 | 12/1989 | Kumar et al. | 363/47 |
| 4,937,540 | 6/1990 | Carlson et al. | 363/47 |
| 5,227,962 | 7/1993 | Marsh | 363/39 |
| 5,345,375 | 9/1994 | Mohan | 363/40 |
| 6,011,705 | 1/2000 | Duca et al. | 363/47 |

*Primary Examiner*—Jeffrey Sterrett
*Attorney, Agent, or Firm*—Evenson, McKeown, Edwards & Lenahan, P.L.L.C.

[57] ABSTRACT

A filter for a direct current voltage converter includes chokes L1, L2 and capacitors C1, C21. The filter is connected between the feeding source and the direct voltage converter, and an auxiliary alternating voltage source $U_H$ connected in series with the capacitor C1 has the same alternating voltage amplitude as the interference voltage $U_{C1}$ at 180° phase angle rotation.

4 Claims, 9 Drawing Sheets

FILTER FOR A D. C. CONVERTER

BACKGROUND AND SUMMARY OF THE INVENTION

This application claims the priority of German patent document 198 55 439.7, filed Nov. 27, 1998, the disclosure of which is expressly incorporated by reference herein.

The invention relates to a d.c. converter which operates according to the switch controller principle.

D.C. converters of this type generate alternating currents to of undesirable high frequencies, which are superimposed on the received direct current. In order to protect an input direct voltage source from such interference, a filter consisting of chokes and capacitors must be connected between it and the direct current converter. As the result of the good attenuation of multistage L-C filters, the interference currents can be attenuated to acceptable values for the feeding source.

In all applications, and particularly when used in aviation and space operations, such voluminous chokes and capacitors are undesirable because they increase the size, and especially the weight, of the power supply systems.

It is an object of the invention to provide a choke which is small and light weight, without changing the characteristic attenuation curve of the filter to such an extent that the effective protection against high-frequency interferences is lost.

This and other objects and advantages are achieved by the filter for a D.C. voltage converter according to the invention, which includes chokes L1, L2 and capacitors C1, C21. The filter is connected between the feeding source and the direct voltage converter, and an auxiliary alternating voltage source $U_H$ connected in series with the capacitor C1 has the same alternating voltage amplitude as the interference voltage $U_{C1}$ at 180° phase angle rotation.

Other objects, advantages and novel features of the present invention will become apparent from the following detailed description of the invention when considered in conjunction with the accompanying drawings.

DETAILED DESCRIPTION OF THE DRAWINGS

Figure 1:
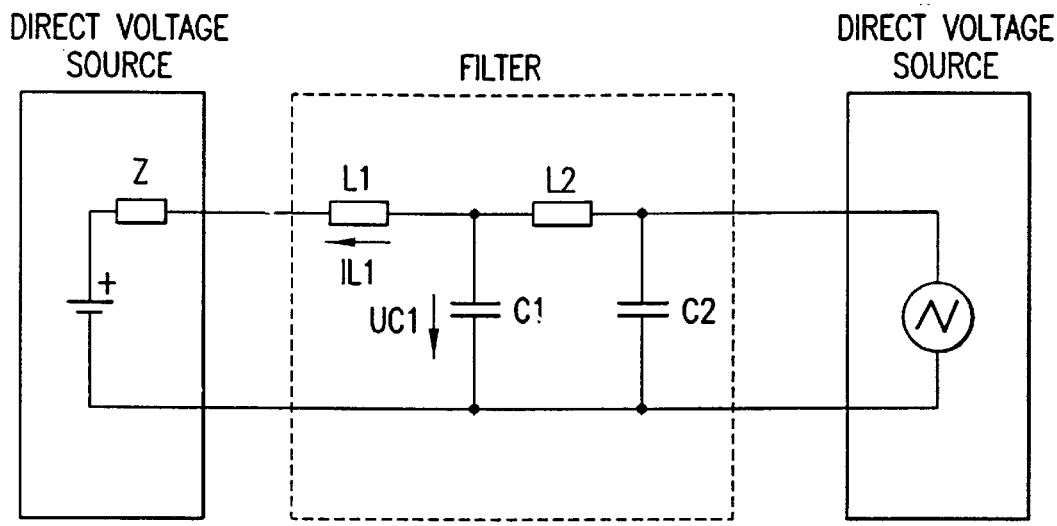
FIG. 1 is a view of an L-C filter according to the prior art.

FIG. 1 shows the configuration of a conventional L-C filter. The undesirable interference current $I_{L1}$ is driven by the interference voltage $U_{C1}$ (alternating voltage fraction) as the result of the choke L1. The d.c. voltage fraction of $U_{C1}$ is not relevant to the following observations and will therefore not be discussed in detail. If the inductive elements L1 and L2 are reduced in order to save volume and mass, the interference voltage $U_{C1}$ and thus also the interference current $I_{L1}$ become larger, and are no longer acceptable for the feeding source.

Figure 2:
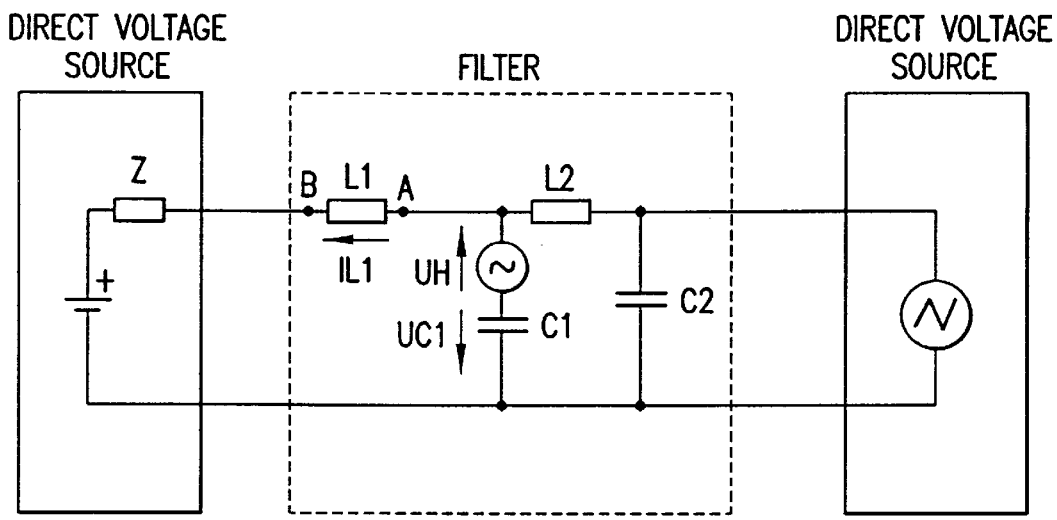
FIG. 2 is a view of an L-C filter according to the invention.

The solution to this problem according to the invention is illustrated in FIG. 2. An auxiliary alternating voltage source $U_H$ connected in series with C1 has the same alternating voltage amplitude as the interference voltage $U_{C1}$, but at 180° phase angle rotation.

As the result of the phase opposition, the two voltages cancel one another out, and the current-driving alternating voltage component at the input of L1 (connection A) becomes zero. Thus the interference current $I_{L1}$ is eliminated.

Figure 3:
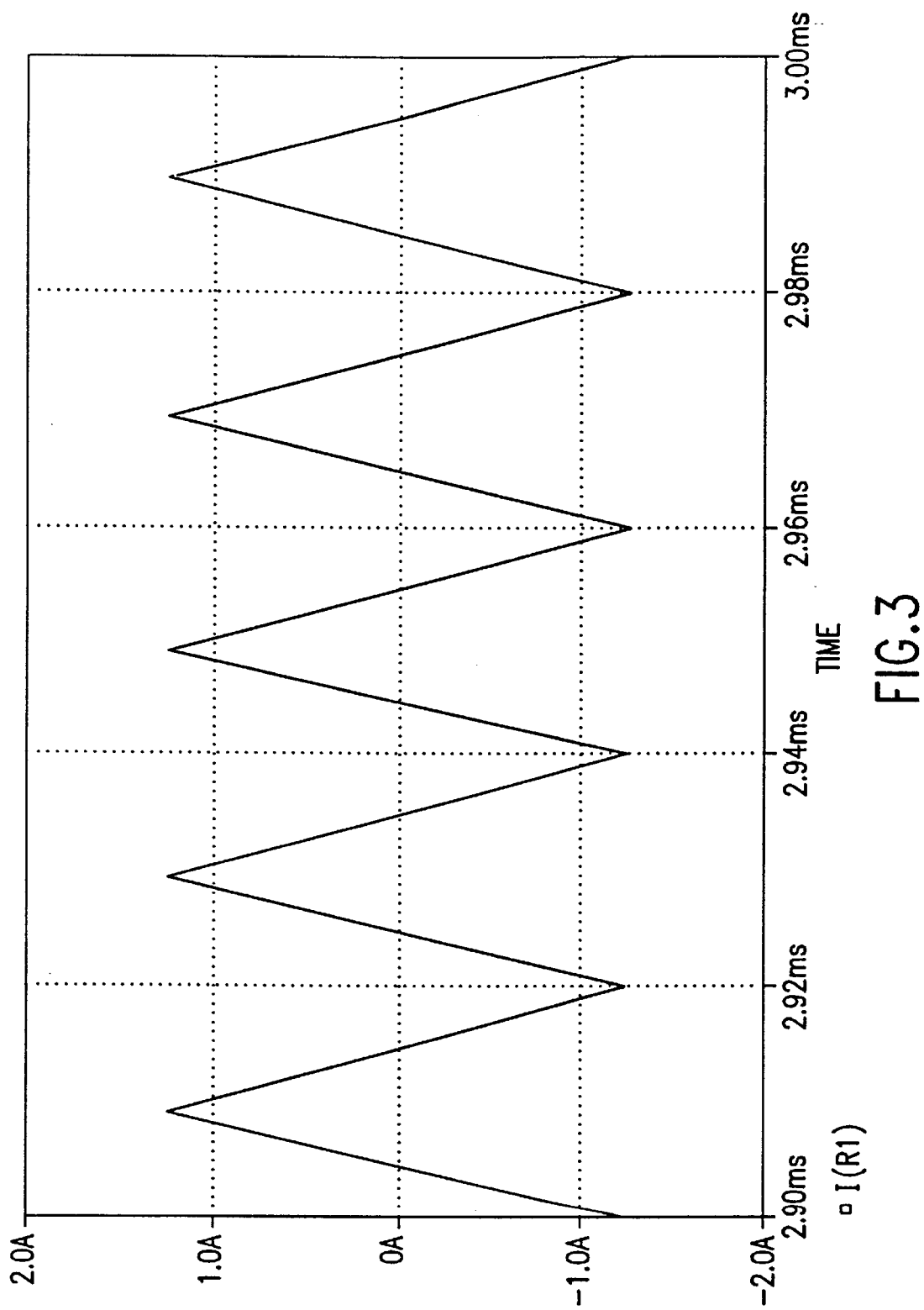
FIG. 3 is a graphic depiction of the interference current of a d.c. voltage converter.
Figure 4:
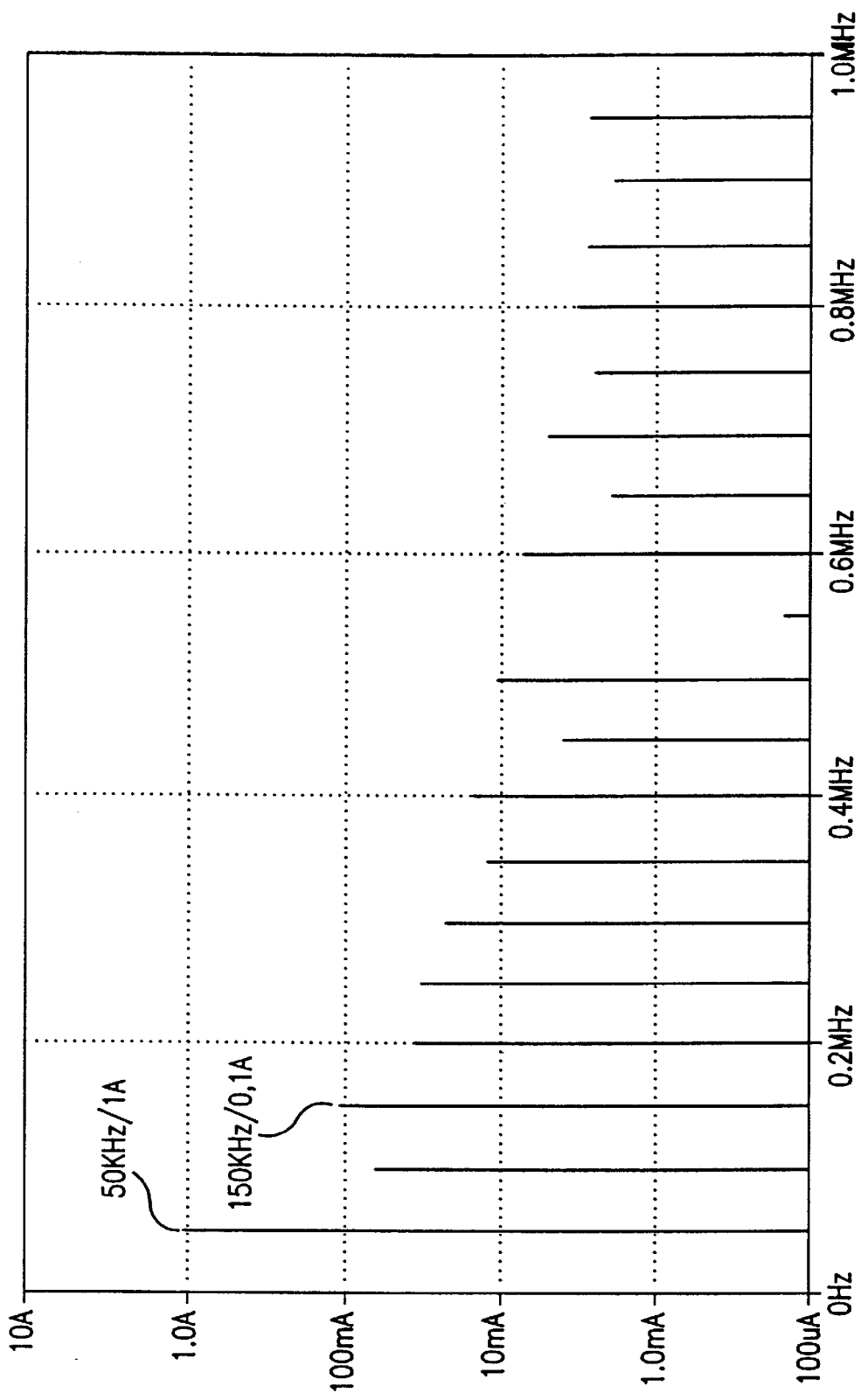
FIG. 4 shows the frequency spectrum of the converter interference current.

The complete extinguishing of $I_{L1}$ naturally functions ideally only with the assumption that the d.c. voltage converter generates only a fixed interference frequency without harmonic waves. The actual interference current of a d.c. converter is illustrated in FIG. 3, while FIG. 4 shows a Fourier analysis frequency spectrum of the triangular current. The fundamental frequency is at 50 kHz/1A, and the strongest harmonic wave is at 150 kHz/0.1 A. Thus, by means of the antiphase coupling-in of a 50 kHz auxiliary voltage, only the fundamental wave can be extinguished.

For attenuating harmonic waves, a multistage L-C filter will still be required. However, since the harmonic waves have only small amplitudes at high frequencies, the necessary chokes can be significantly smaller than in the case of a conventional filter, which must be designed for the 50 kHz fundamental wave.

Figure 5:
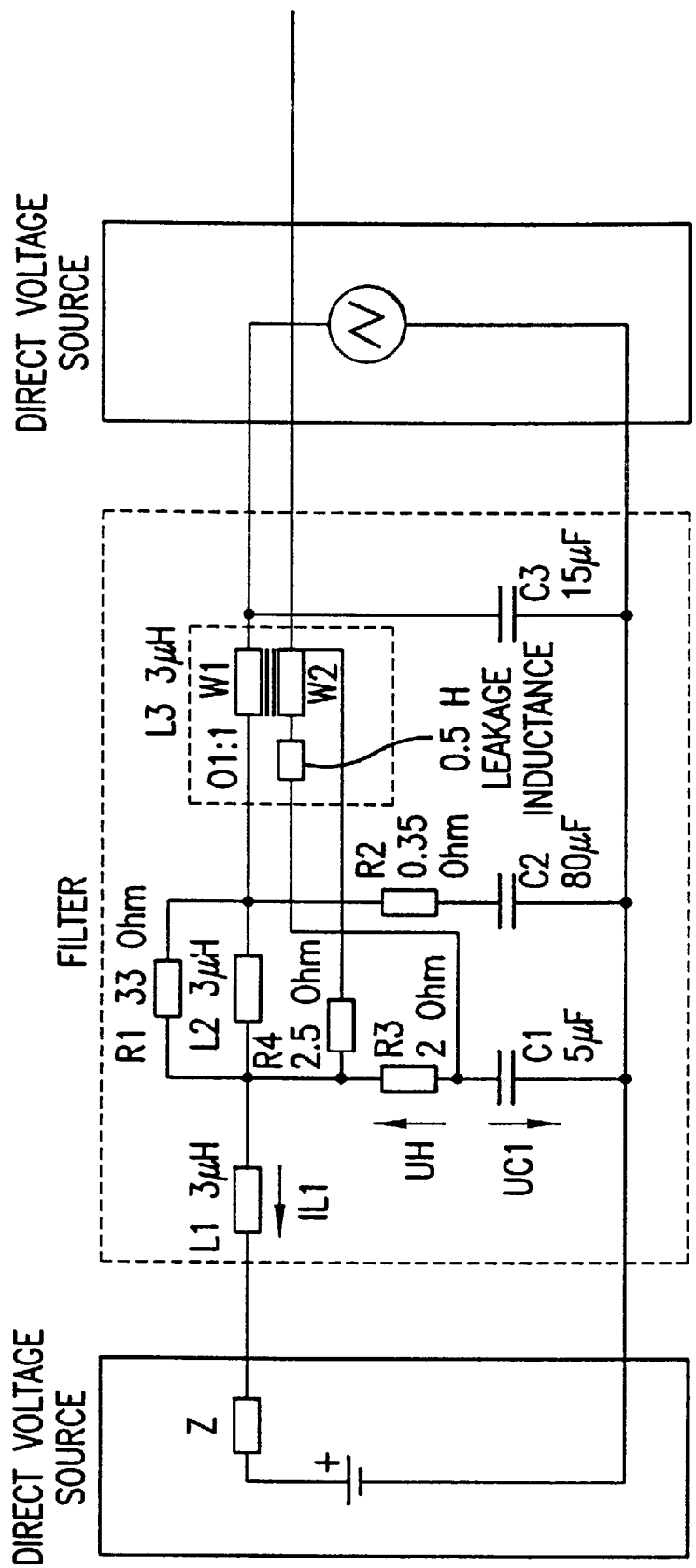
FIG. 5 is a circuit diagram of the filter according to the invention.
Figure 8:
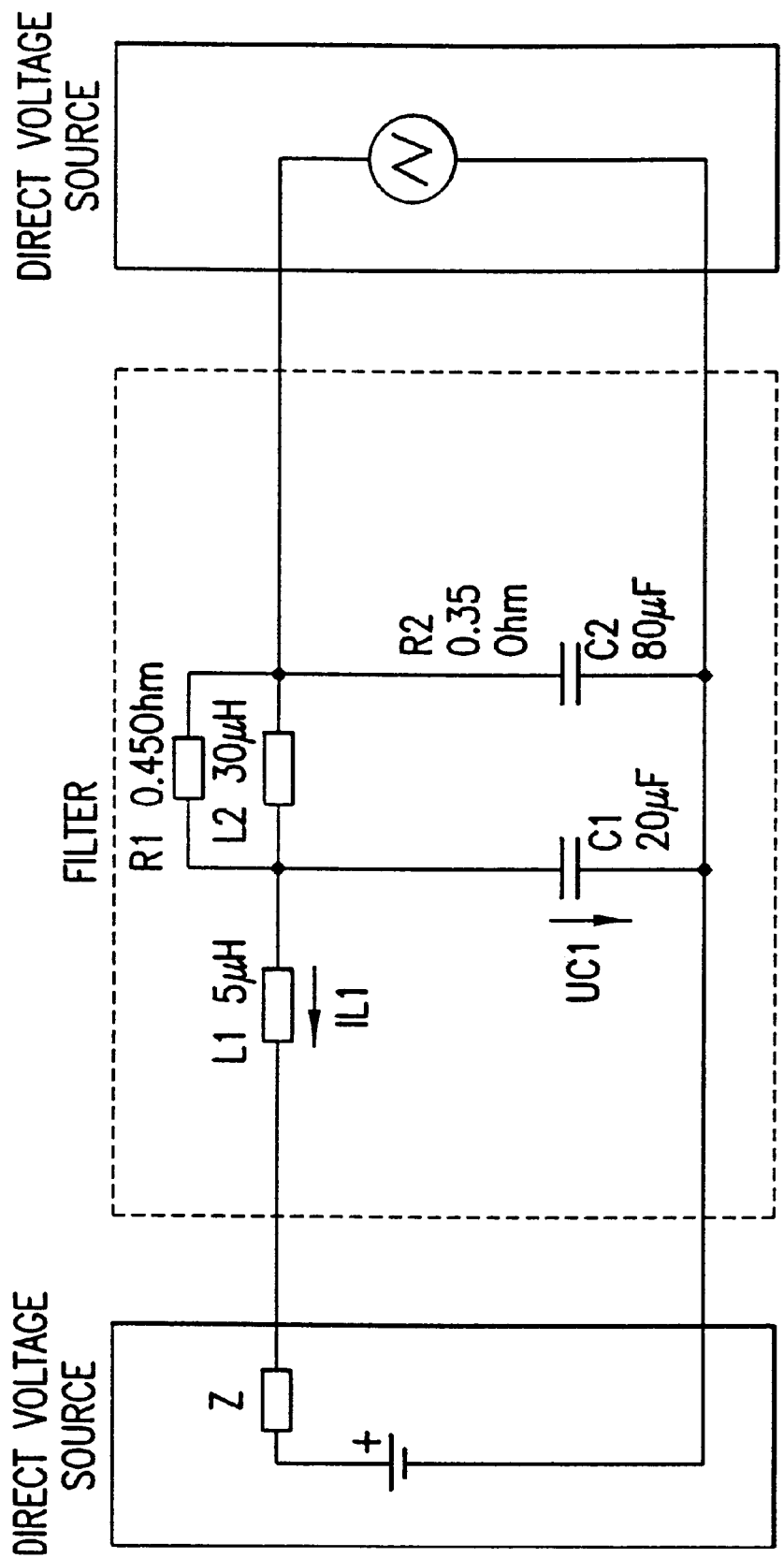
FIG. 8 is a circuit diagram of a filter according to the prior art.

FIG. 5 shows a circuit for technical implementation of the filter according to the invention, while for the purpose of a comparison, FIG. 8 shows a filter according to the prior art. Both filters have the purpose of attenuating the 50 kHz fundamental wave of the d.c. voltage converter from 1 Aeff to 10 mAeff. The current amplification in the filter resonance frequencies must be limited by means of additional resistors in series or in parallel to capacitors and chokes, to maximally 1.4 Aeff.

Figure 6:
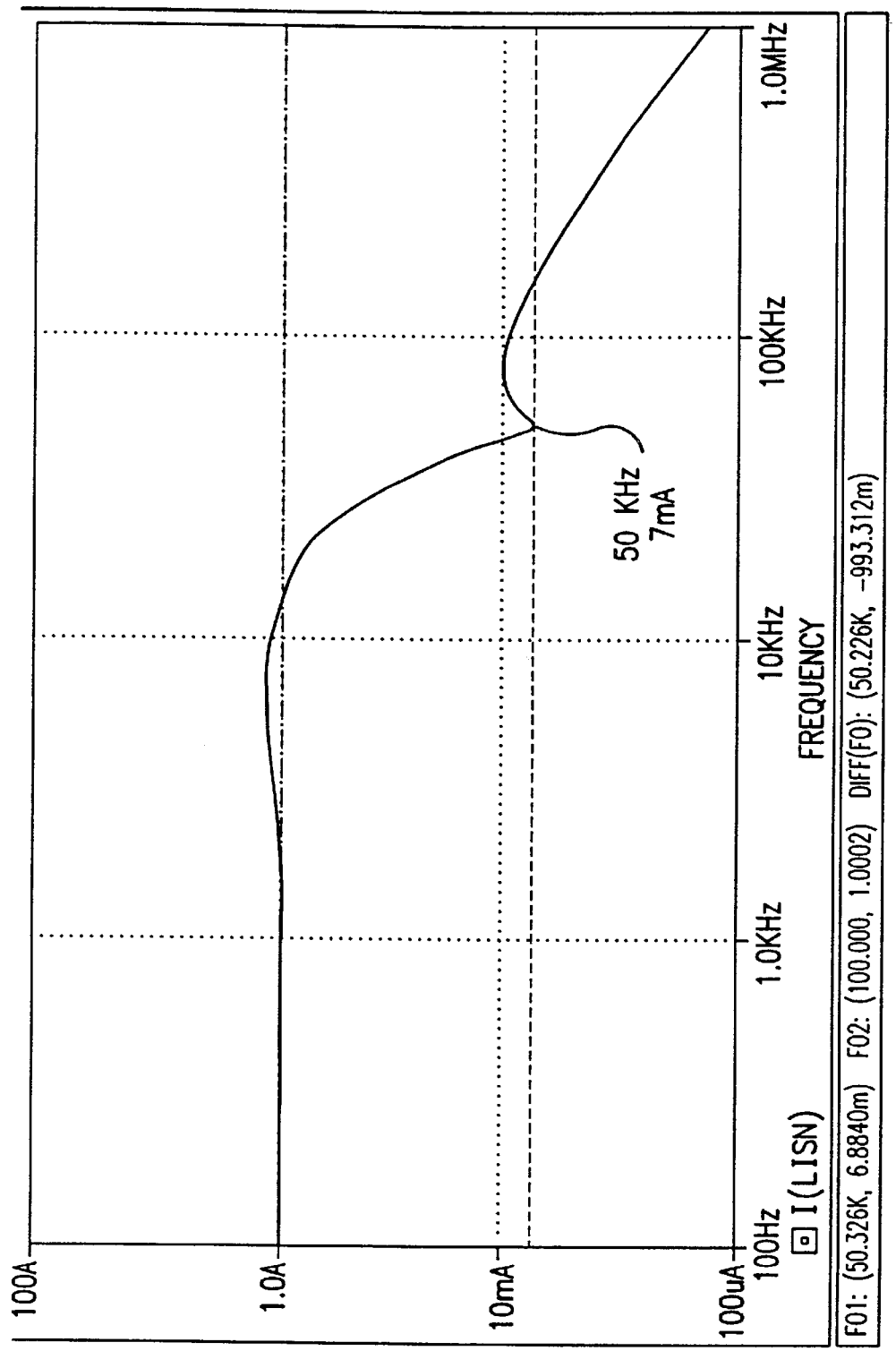
FIG. 6 is a graph of the attenuation curve (logarithmic representation) of the filter according to the invention.
Figure 7:
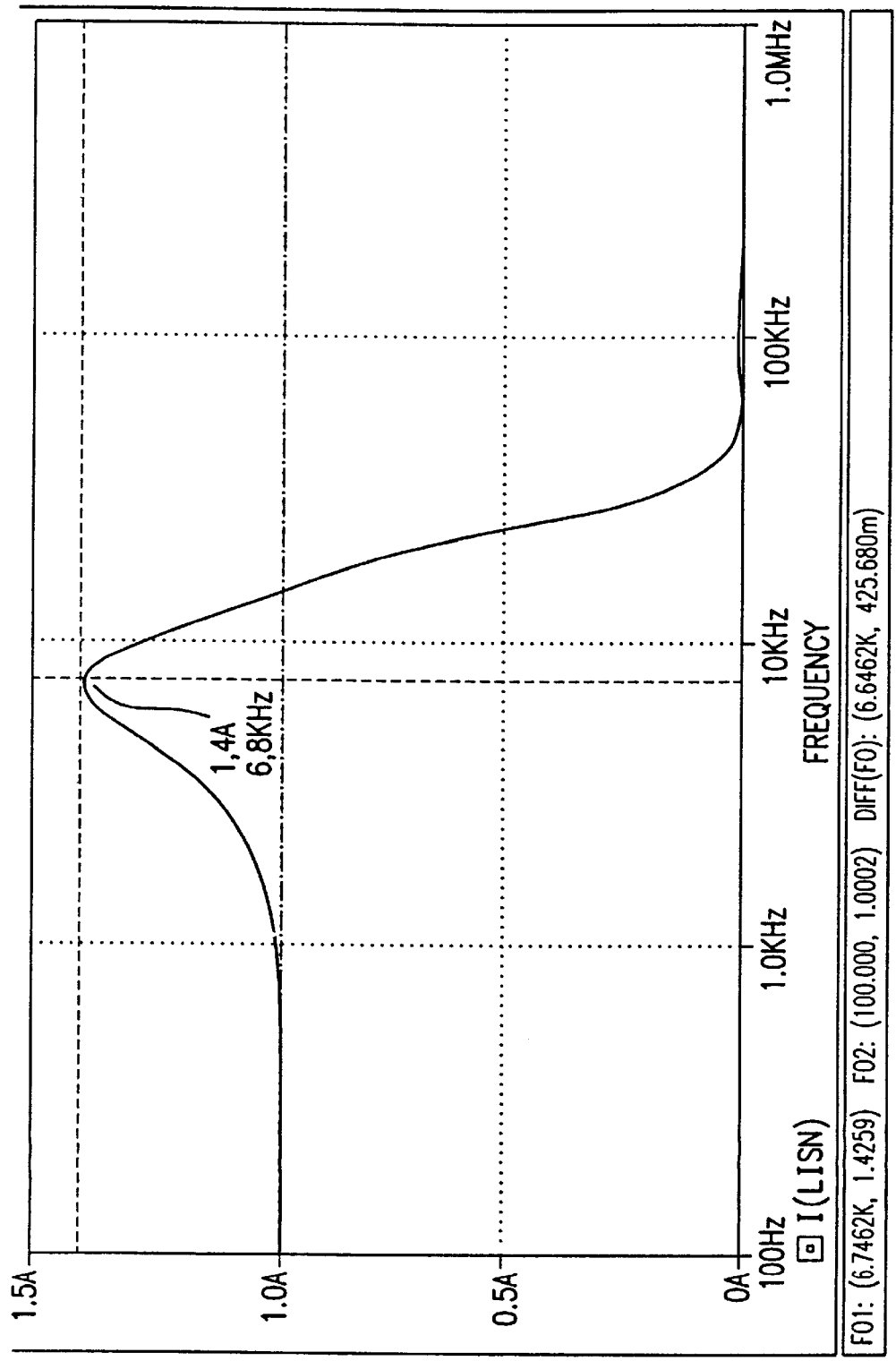
FIG. 7 is a graph of the attenuation curve (linear representation) of the filter according to the invention.

The filter according to the invention—in the following called FRC (Feedback Ripple Compensation)—consists of three L-C stages. The auxiliary voltage source $U_H$ is generated by the choke L3 (secondary winding W2) and is coupled in at the capacitor C1 by way of the resistors R4, R3. The required phase opposition of $U_{C1}$ and $U_H$ is achieved by the phase angle rotation of L3, C2, L2, C1 which, in the case of the frequency to be extinguished (50 kHz), is tuned to 180°. The attenuation curve of the FRC is illustrated in FIGS. 6 and 7. In the case of the 50 kHz fundamental frequency, the 1 Aeff current is attenuated to 7 mA (FIG. 6). The current amplification in the resonance frequency of the FRC amounts to 1.4 Aeff (FIG. 7).

Figure 9:
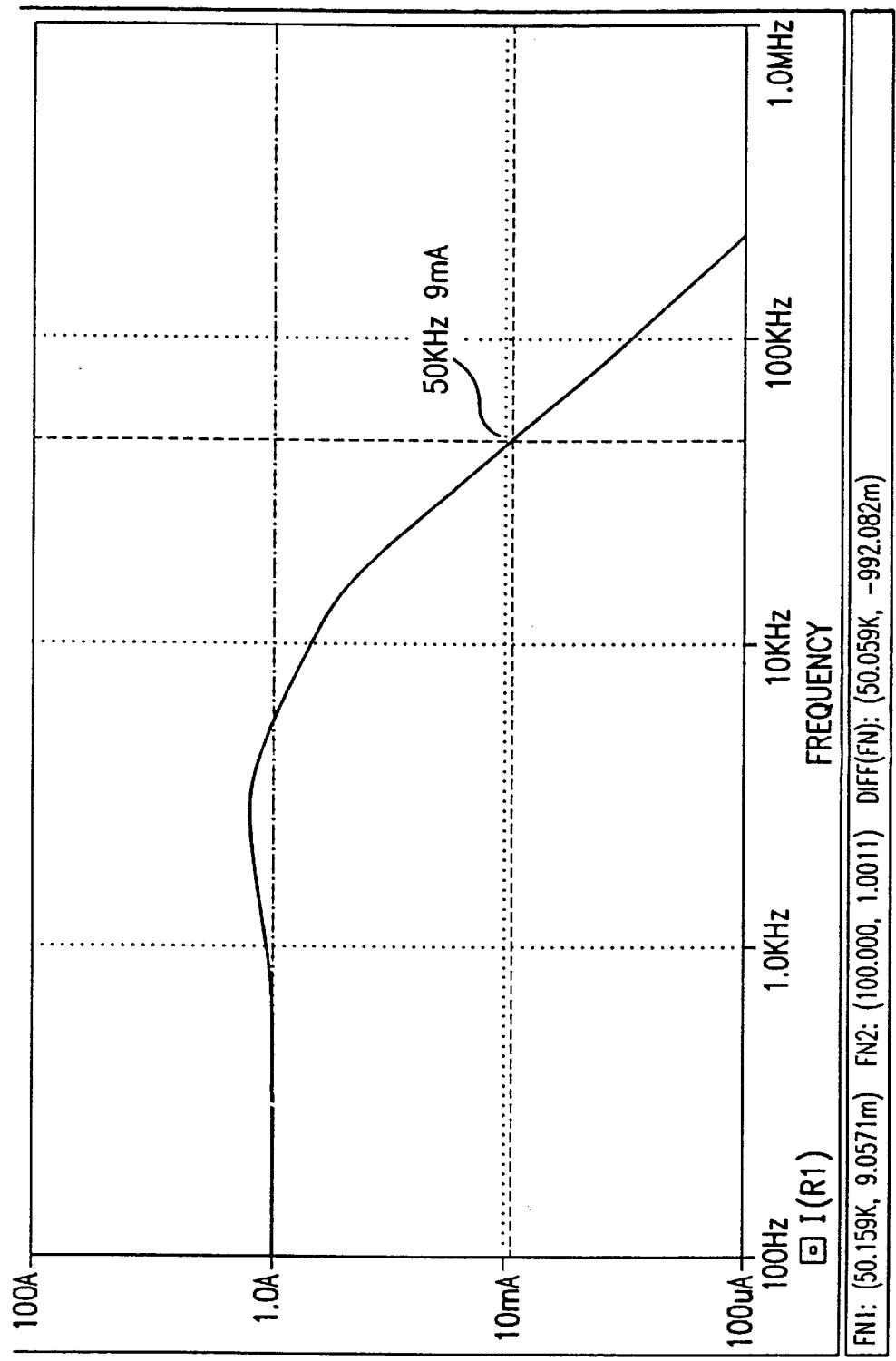
FIG. 9 is a graph of the attenuation curve (logarithmic representation) of the filter of FIG. 8.
Figure 10:
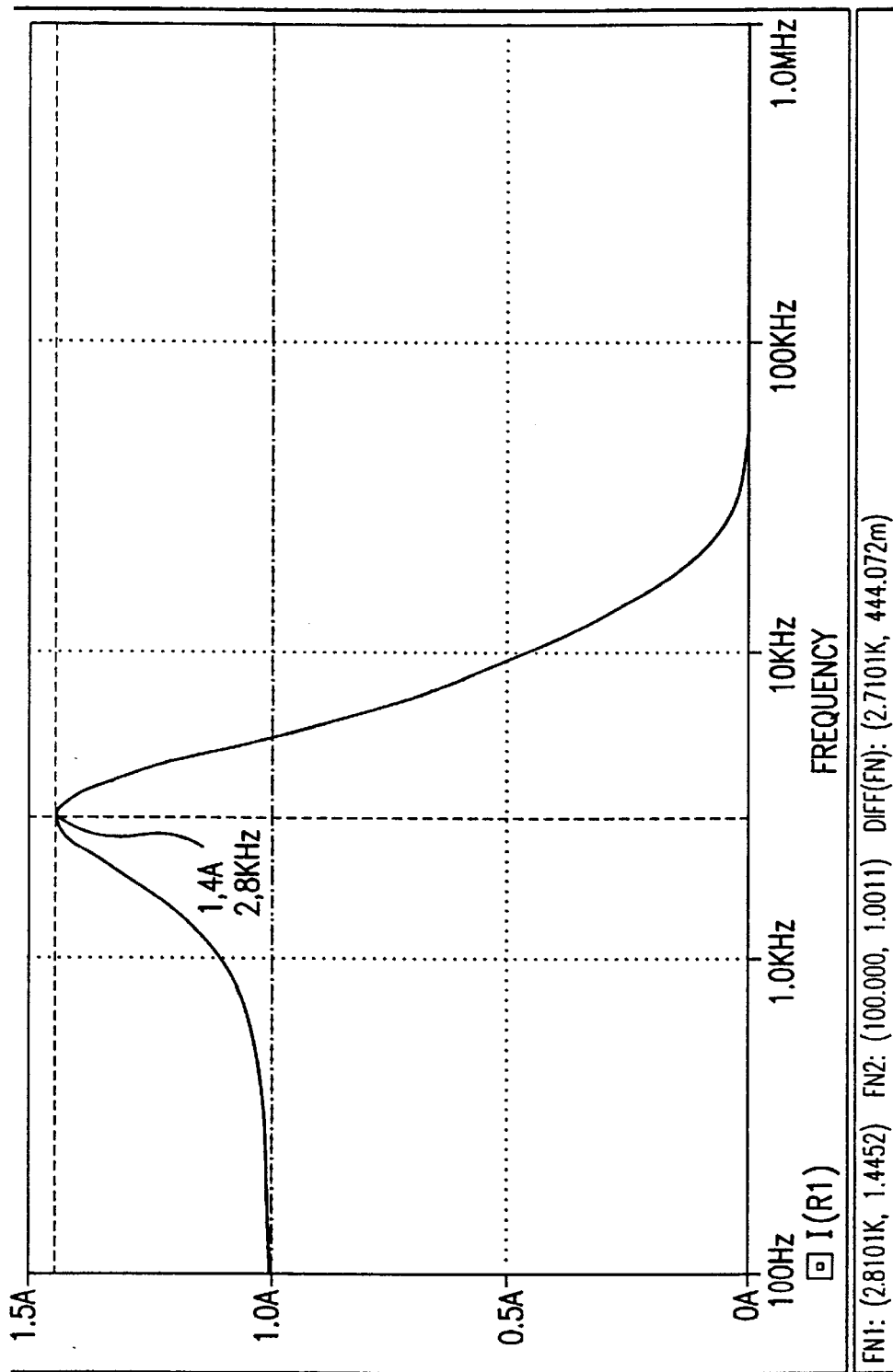
FIG. 10 is a graph of the attenuation curve (linear representation) of the filter which is part of the prior art.

The prior art filter shown in FIG. 8 is designed according to the optimization guidelines by D. Venable described in the essay "Minimizing Input Filter Requirements Power Supply Design" (PCIM May 1987). The 50 kHz fundamental wave is attenuated from 1 Aeff to 9 m Aeff (FIG. 9). The current amplification in the resonance frequency (FIG. 10) amounts to 1.4 Aeff.

The data of the two filters are compared in the following table.

|  | Filter<br>Prior Art | FRC Filter<br>Acc. to Invention |
| --- | --- | --- |
| Attenuation (des > 100) | 1 Aeff:9 mAeff = 111 | 1 A:7 mA = 143 |
| Resonance Step-up | 1.4 A | 1.4 A |
| Total Capacitance | C1 + C2 | C1 + C1 + C3 |
|  | 100 µF | 100 µF |
| Total Inductance | L1 + L2 | L1 + L2 + L3 |
|  | 35 µH | 9 µH |

In the case of approximately the same fundamental wave attenuation and the same capacitance, the FRC filter requires only 26% of the inductance of the Venable filter (9 µH in contrast to 35 µH). This results in the desired saving of mass and volume.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Filter for a d.c. voltage converter, the filter being connected between an input d.c. voltage source and the direct voltage converter, and comprising:

series connected chokes;

parallel connected capacitors; and an auxiliary alternating voltage source connected in series with one of the capacitors, and having an alternating voltage amplitude which is the same as an interference voltage at a 180° phase angle rotation.

2. The filter according to claim 1, having three L-C stages, wherein:

the auxiliary voltage source is generated by a choke and is coupled via resistors at the one of said capacitors; and the phase angle rotation achieved by an inductive—capacitive network which, in the case of a frequency to be extinguished, is tuned to 180°.

3. A method of suppressing an a.c. interference current in a filter for a d.c. voltage converter, having a plurality of series connected inductive elements and a plurality of parallel connected capacitive elements, comprising:

connecting an auxiliary a.c. voltage source in series with one of said capacitors, said a.c. voltage source having a frequency which is the same as a fundamental frequency of said a.c. interference current; and shifting a phase of the auxiliary voltage source to a phase which is opposite that of the interference current.

4. An a.c. voltage generator comprising:

a d.c. voltage source;

a d.c. to a.c. converter;

a filter connected between the d.c. voltage source and the converter; wherein the filter comprises series connected chokes; and parallel connected capacitors; and an auxiliary alternating voltage source connected in series with one of the capacitors, and having an alternating voltage amplitude which is the same as an interference voltage at a 180° phase angle rotation.

* * * * *